Figure 1:
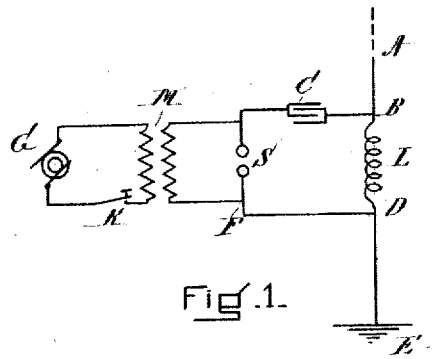

No. 822,936. PATENTED JUNE 12, 1906.
L. DE FOREST.
WIRELESS TELEGRAPH SYSTEM.
APPLICATION FILED FEB. 2, 1906.

WITNESSES:
Frank G. Parker.
John Buckler.

INVENTOR:
Lee de Forest
by Geo. K. Woodworth
Atty.

UNITED STATES PATENT OFFICE.

LEE DE FOREST, OF NEW YORK, N. Y.

WIRELESS-TELEGRAPH SYSTEM.

No. 822,936.   Specification of Letters Patent.   Patented June 12, 1906.

Application filed February 2, 1906. Serial No. 299,091.

*To all whom it may concern:*

Be it known that I, LEE DE FOREST, a citizen of the United States, and a resident of New York, in the county of New York and State of New York, have invented a new and useful Improvement in Wireless-Telegraph Systems, of which the following is a specification.

My invention relates to wireless-telegraph systems in which a closed oscillating circuit is coupled to an open oscillating or radiating circuit; and the object of my invention is to provide a coupled wireless-telegraph system whose natural mode of vibration is monoperiodic.

As is now well understood, the resultant vibration produced by the natural oscillatory restoration to electrical equilibrium of a coupled system consisting of two circuits, both of which when isolated have the same natural period, is not in general monoperiodic, but is multiperiodic, consisting of at least two frequencies, neither one of which is equal to that natural to either of said circuits. Thus if the waves radiated by such a system be measured by a wave-meter at least two wave lengths will be found, so that if a curve be plotted having as its ordinates the currents or potentials developed in the wave-meter circuit and as its abscissæ the progressively-varying values of the frequencies natural to said wave-meter circuit, at least two maxima of current or potential will be observed, and it will be found that the frequencies corresponding to said maxima are not the same as those natural to either of the component circuits of the coupled system. In wireless telegraphy such multiperiodic vibration renders accurate tuning impossible, for there are at least two frequencies, and therefore a receiving-circuit can be attuned to either one of them, and also it renders transmission inefficient, for the radiated energy is distributed over or divided between waves of two frequencies instead of being concentrated into waves of one frequency. Therefore in order to render accurate tuning and efficient transmission possible it is necessary to employ a transmitting system which will develop electromagnetic waves of a single frequency and a receiving system which will respond to waves of but a single frequency. Various systems known as "loosely-coupled" systems have been devised for accomplishing the foregoing results, but these in general depend upon loose magnetic linkage between the antenna and its associated transmitting or receiving circuit, and therefore are unsuited for commercial long-distance working. While the literature of this art abounds in mathematical treatises on the laws of coupled systems, I find that the following simple considerations suffice to explain the phenomena: Referring to the diagram shown in Figure 1, which represents, substantially, the circuit arrangements described in my Patent No. 802,850, October 24, 1905, it will be observed that when the sonorous circuit C S L, including the condenser C, spark-gap S, and inductance L, creates oscillations in the antenna system A L E, which when isolated has the same natural period as said sonorous circuit, such oscillations have two paths from the top of the antenna to earth. One path consists of the antenna A, the inductance L, and earth connection D E. The other path consists of the antenna A, the condenser C, the spark-gap S, the conductor F D, and the earth connection D E. The two said paths are not of equal periods, for the former has a relatively large period, corresponding to a relatively low frequency as compared to the latter, because the former path includes the capacity and inductance of the antenna, the lumped inductance of the coil L, and the capacity and inductance of the earth connection, but no lumped capacity, whereas the latter path includes no lumped inductance, but only the distributed inductance of the circuit A B C S F D E and the resultant capacity of said circuit, which is of course much smaller than either the distributed capacity of said circuit or the lumped capacity of the condenser C, included therein, the two capacities being connected in series. Inasmuch as the two paths are not equal in period and as each vibrates in its own natural period, it follows that a complex or multiperiodic wave is radiated. If, however, the two paths can be made equal in period, the oscillations in the system will have but one frequency, and the electromagnetic waves radiated by said system will be monoperiodic.

My invention consists in means for making the aforesaid two paths from the top of the antenna to earth equal in period and will be explained with reference to the drawings which accompany and form a part of this specification.

Figure 2:
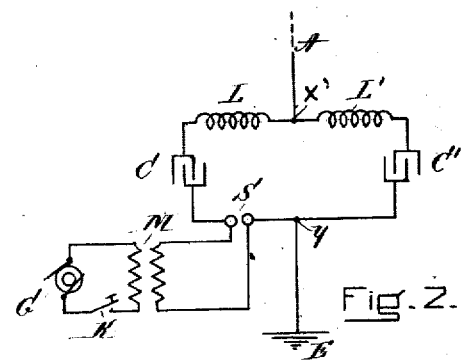

In the drawings, Fig. 1 represents in diagrammatic form a wireless-telegraph transmitting system already referred to. Fig. 2 represents diagrammatically a wireless-telegraph transmitting system embodying the principles of the present invention; and Figs. 3 to 6, inclusive, represent modifications of the system shown in Fig. 2.

In the figures, L L' L'' are inductances.

C C' are condensers.

M is a transformer.

G is an alternator.

K is a key.

S is a spark-gap.

S' S'' represent a double spark-gap, and A is an antenna earthed at E.

In Fig. 2 the condensers C C' may be equal in capacity and the coils L L' may be equal in inductance. When so constituted, the natural period of the circuit C L L' C' S is equal to the natural period of either of its component parts S C L and L' C', for by putting said component parts in series the resultant capacity of the circuit C L L' C' S is one-half that of either condenser C or C', while the resultant inductance of said circuit is double that of either coil L or L'. The fact that one of the component parts of the oscillating circuit C L L' C' S includes the spark-gap S does not appreciably affect the equality of the aforesaid natural periods, because the resistance of the gap when sparks are passing is only about two or three ohms. The electromagnetic constants of the antenna A $x$ and the earth connection $y$ E are so chosen that the fundamental natural period of the system A $x$ $y$ E, hereinafter referred to as the "antenna system," is equal to that of the closed oscillating circuit C L L' C' S, which in turn, as above explained, is equal to the natural period of each of its component parts $x$ L C S $y$ and $x$ L' C' $y$. It will now be seen that the two paths from the top of the antenna to the earth E are equal in natural period, so that therefore the electrical oscillations developed in the antenna system have but one natural rate of vibration and that therefore the resulting electromagnetic waves are monoperiodic in character. Furthermore, it will be noted that the frequency of said oscillations and said waves is equal to the frequency natural to the circuit C L L' C' S, which is equal to the frequency natural to either of the components of said circuit—viz., $x$ L C S $y$ and $x$ L' C' $y$—and which is equal also to the frequency natural to either of the two paths from the top of the antenna to earth—viz., A $x$ L C S $y$ E and A $x$ L' C' $y$ E. The reason why the said two paths are equal in period to the closed oscillating circuit is substantially the same as that above set forth in explaining why the two components of said closed oscillating circuit were equal in period to the said circuit and is that the systems A $x$ L C S $y$ E and A $x$ L' C' $y$ E each have a resultant capacity equal to one-half that of the condensers C C' or of the antenna system and a resultant inductance equal to twice that of the coils L L' or of the antenna system, provided that the capacity of the antenna system is equal to that of the condensers C C' and the inductance of the antenna system is equal to that of the coils L L'.

Although for the purpose of more clearly explaining my invention I have described the condensers C C' as being equal in capacity and the coils L L' as being equal in inductance and although such proportionment is preferred, I do not wish to be limited thereto, for it will be apparent that my invention consists in making the two paths from the top of the antenna to earth equal in period and that this may be accomplished in a variety of ways. For example, the condensers C C' may be unequal in capacity and the coils L L' may be unequal in inductance; but they must be so proportioned that the product C L is equal to the product C' L' and then the two paths to earth from the top of the antenna will each have an equivalent effective inductance and effective capacity and will be equal in natural period. In this case said natural period will be equal to that of the closed oscillating circuit C L L' C' S and will be determined by the product $\frac{C C'}{C + C'}$ (L + L'), and this in turn will be seen to be equal to the products C L or C' L' when C L = C' L'. In short, the results obtained by making the condensers C C' unequal in capacity and the coils L L' unequal in inductance, but so proportioned that C L = C' L' is identical to the result obtained when the two condensers are made equal in capacity and the two coils equal in inductance. It is not to be understood from the foregoing, however, that it is necessary to make the capacity of the antenna system equal to that of the condensers C C' or to make the inductance of the antenna system equal to that of the coils L L', for, as shown in Figs. 5 and 6, the inductance of the antenna system may be greater than that of the coils L or L', while the capacity of the condensers C or C' in such case must necessarily be correspondingly greater than the capacity of the antenna system.

Figure 3:
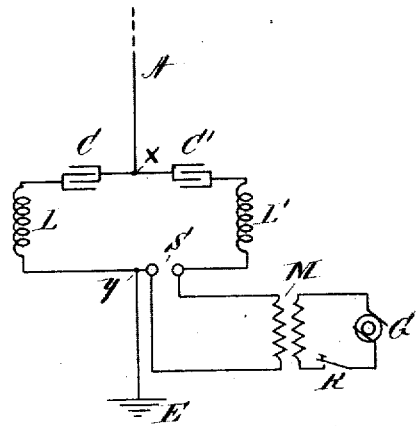

The system shown in Fig. 3 is electrically the equivalent of that shown in Fig. 2, the particular circuital arrangement of the condensers and coils being immaterial.

Figure 4:
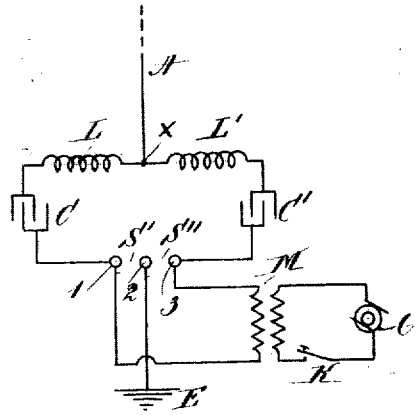

In the system shown in Fig. 4 each of the component parts of the closed oscillating circuit includes a spark-gap S' S'', respectively, the spark-ball 1 being in one part and the ball 3 in the other, while the center ball 2 is earthed at E. In this case the two paths to earth from the top of the antenna are absolutely identical in every respect.

Figure 5:
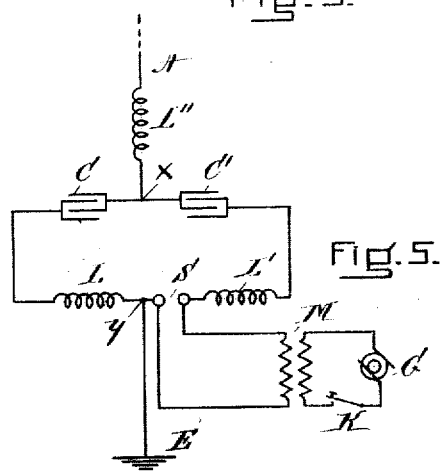
Figure 6:
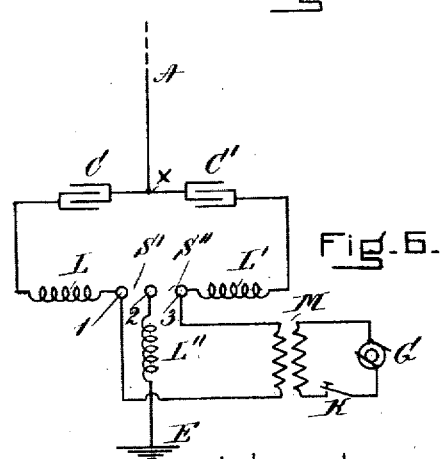

It is frequently desirable to increase the natural period of the antenna system without at the same time altering the natural period of the closed oscillating system for the purpose of putting the two systems into syntony, and this, as shown in Figs. 5 and 6, may be accomplished by connecting the inductance L″ in any of the systems shown in Figs. 2, 3, and 4 either in the antennæ proper or in the connections to earth. In these cases, as in the arrangements shown in Figs. 2, 3, and 4, the natural period of each of the two paths to earth from the top of the antenna will be equal to that of the closed oscillating circuits C L S L′ C′ and C L S′ S″ L′ C′ of Figs. 5 and 6, respectively. Although in these cases the inductance of the antenna system is greater than that of either coil L L′ and the capacity of either condenser C C′ is greater than that of the antenna system, it will be seen that as the antenna system and the closed oscillating system are in syntony, as aforesaid, there is approximately $$\frac{CC_o}{C+C_o}(L_o+L''+L)=$$
$$\frac{C'C_o}{C'+C_o}(L_o+L''+L')=\frac{CC'}{C+C'}(L+L')$$

when $$CL=C'L'=C_o(L_o+L''),$$

where $C_o$ $L_o$ represent, respectively, the equivalent in lumped capacity and inductance of the distributed capacity and inductance of the antenna system. In other words, it is not essential in any case to make the capacity of the antenna system equal to the capacity of the condensers C C′ or to make the inductance of the antenna system equal to the inductance of the coils L L′ any more than it is necessary to make the condensers C C′ equal in capacity or to make the coil L L′ equal in inductance, all that is necessary in all cases being to make the product of the resultant capacity by the total inductance of any one of the three parts of the system equal to product of the resultant capacity by the total inductance of each of the other two parts of the system.

While I have described the foregoing arrangements of circuits as constituting wireless-telegraph transmitting systems, it will be obvious that the principles involved may also be applied to wireless-telegraph receiving systems and that the only change involved in so applying them is the substitution of an oscillation-detector and its associated apparatus for the spark-gap S and its associated apparatus in Figs. 2, 3, and 5. Therefore throughout the following claims, unless otherwise specified, by the term "wireless-telegraph system" I desire to be understood as meaning either a transmitting or a receiving system, and by the term "closed oscillating circuit" I desire to be understood as meaning either the circuit whereby oscillations are created in a transmitting antenna and which includes a spark-gap or the circuit which receives oscillations from a receiving antenna and which includes an oscillation-detector.

I do not wish to be limited to any of the particular organizations shown in the drawings or to any of the particular proportionments of the electromagnetic constants thereof herein specified for the purpose of more fully explaining the principles of my invention, because my invention may be subjected to a wide range of variation by those skilled in the art without departing from said principles or from the spirit thereof.

I claim—

1. A monoperiodic wireless-telegraph system comprising an antenna system, and a closed oscillating circuit connected thereto and so constructed and arranged that the two paths from the top of the antenna to earth are equal in natural period.

2. A monoperiodic wireless-telegraph system comprising an antenna system, and a closed oscillating circuit connected thereto and so constructed and arranged that the two paths from the top of the antenna to earth are identical.

3. A monoperiodic wireless-telegraph system comprising an antenna system, and a closed oscillating circuit connected thereto and so constructed and arranged that the two paths from the top of the antenna to earth have equivalent effective capacity and effective inductance.

4. In a wireless-telegraph system, a closed oscillating circuit having a definite natural period and consisting of two parts, each of which has the same natural period as said closed oscillating circuit, and an antenna system connected to said closed oscillating system between the two parts thereof, the antenna system having the same natural period as said closed oscillating circuit and the two paths to earth from the top of said antenna system each being equal in period to said closed oscillating circuit.

5. In a wireless-telegraph system, a closed oscillating circuit having a definite natural period and consisting of two parts, a capacity and an inductance included in each of said parts and so proportioned that the product of the capacity of one part by the inductance of the same part is equal to the product of the capacity of the other part by the inductance of said other part, and an antenna system connected to said closed oscillating circuit between the two parts thereof and having a natural period equal to that of said closed oscillating circuit.

6. In a wireless-telegraph transmitting system, an antenna system, a closed oscillating circuit connected thereto and so constructed and arranged that the two paths from the top of the antenna to earth are equal in natural period, and means associated with said oscillating circuit for causing the same to execute electrical oscillations.

7. In a system for developing and radiating monoperiodic electromagnetic waves, an antenna, a circuit including a capacity, an inductance and a spark-ball connected thereto at a point, another circuit including a capacity, an inductance and a spark-ball connected to the antenna system at the same point, the capacities and inductances of said circuits being so proportioned that the said circuits are equal in natural period, a third spark-ball located between said spark-balls and an earthed conductor connected to said third spark-ball.

8. In a wireless-telegraph transmitting system, an antenna system, a closed oscillating circuit connected thereto and so constructed and arranged that the two paths from the top of the antenna to earth are identical, and means associated with said oscillating circuit for causing the same to execute electrical oscillations.

9. In a wireless-telegraph transmitting system, an antenna system, a closed oscillating circuit connected thereto and so constructed and arranged that the two paths from the top of the antenna to earth have equivalent effective capacity and effective inductance, and means associated with said oscillating circuit for causing the same to execute electrical oscillations.

In testimony whereof I have hereunto subscribed my name this 26th day of January, 1906.

LEE DE FOREST.

Witnesses:
J. H. HARRIS,
ROBT. S. MILLETT.